United States Patent [19]

Imamura

[11] Patent Number: 5,219,055
[45] Date of Patent: Jun. 15, 1993

[54] LOCK-UP CLUTCH PRESSURE CONTROL DEVICE

[75] Inventor: Hiroyuki Imamura, Shizuoka, Japan

[73] Assignee: Jatco Corporation, Japan

[21] Appl. No.: 900,948

[22] Filed: Jun. 17, 1992

Related U.S. Application Data

[63] Continuation of Ser. No. 578,200, Sep. 6, 1990, Pat. No. 5,152,386.

[30] Foreign Application Priority Data

Sep. 8, 1989 [JP] Japan .................................. 1-233998

[51] Int. Cl.⁵ ........................ B60K 41/02; F16H 45/02
[52] U.S. Cl. .................................. 192/0.075; 192/3.3
[58] Field of Search ................... 192/3.3, 0.075, 0.076; 74/890

[56] References Cited

U.S. PATENT DOCUMENTS

| | | | |
|---|---|---|---|
| 3,977,502 | 8/1976 | Chana | 192/3.3 |
| 4,706,790 | 11/1987 | Lockhart et al. | 192/3.3 |
| 5,082,095 | 1/1992 | Imamura | 192/3.3 |

FOREIGN PATENT DOCUMENTS

.0154524  9/1982  Japan .................................. 192/3.3

Primary Examiner—Rodney H. Bonck
Attorney, Agent, or Firm—Ronald P. Kananen

[57] ABSTRACT

A spool of a lock-up control valve has a first effective area exposed to a release pressure which is supplied to a release chamber of the lock-up clutch and a second larger effective area which is exposed to the apply pressure which is supplied to an apply chamber. When acceleration is demanded when the lock-up clutch is in one of slip or fully lock-up modes and a sudden demand for acceleration is made, the pressure differential between the apply and release pressures is reduced below the normal level for a predetermined period of time.

4 Claims, 5 Drawing Sheets

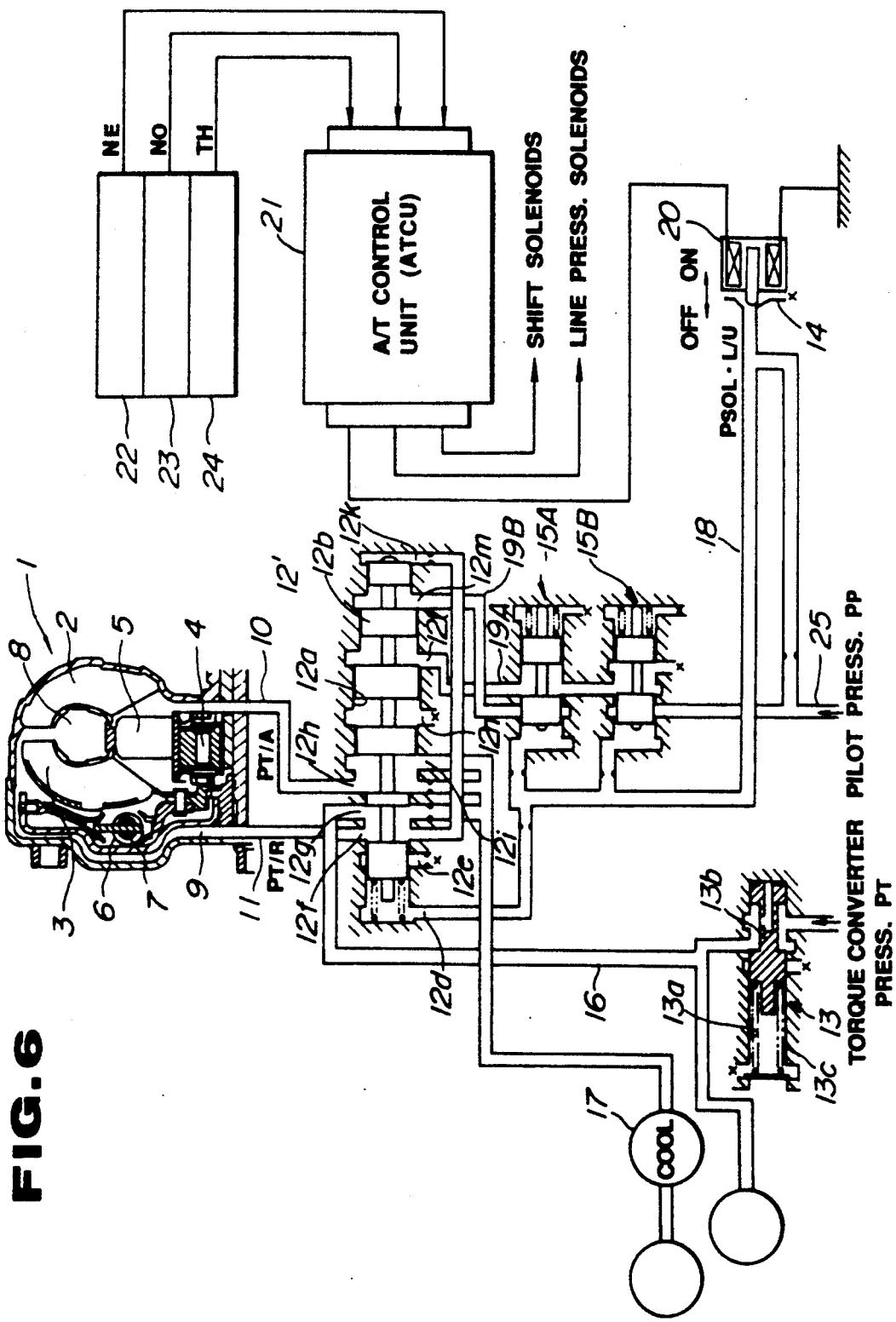

__LOCK-UP CLUTCH PRESSURE CONTROL DEVICE__

This application is a continuation of application Ser. No. 07/578,200 filed Sept. 6, 1990 now U.S. Pat. No. 5,152,386.

BACKGROUND OF THE INVENTION

1. Field of the Invention

The present invention relates generally to a hydraulic control system for an automatic automotive type transmission and more specifically to a lock-up clutch control arrangement for use with such a system.

2. Description of the Prior Art

JP-A-61-206868 discloses a lock-up control arrangement wherein engine load as indicated by engine throttle valve opening degree and vehicle speed are used to determine when a lock-up clutch should be fully released and induce a so-called open converter mode of operation, when the clutch should be partially engaged to induce what is referred to as slip lock-up and when the clutch should be strongly engaged to produce what shall be referred to as full lock-up.

However, with this type of arrangement, a drawback has been encountered in that during, slip or full lock-up modes of operation, if the accelerator pedal is subject to a sudden change in depression degree, the instant lock-up status is maintained until predetermined engine load/vehicle speed requirements are satisfied and the driver is unable to obtain the acceleration characteristics which would be expected for the given amount of pedal depression in response to the pedal depression.

That is to say, due to the load on the engine, when there is a delay between the actual change in throttle position (induced by the accelerator pedal depression) and the actual change in the engine speed.

In the case in which the solenoid valve which controls the lock-up is subject to electronic control, during slip or full lock-up modes of operation, it has been proposed that the rate at which the throttle opening changes be predetermined and if this rate exceeds a predetermined value, the lock-up clutch is conditioned to assume a fully released condition.

However, with this type of proposal, if a fail safe step is included, the control program is rendered undesirably complex and increases the production costs.

SUMMARY OF THE INVENTION

It is an object of the present invention to provide an improved lock-up control arrangement which simplifies the control arrangement, reduces production and maintenance costs, and exhibits suitable accelerator pedal depression/response characteristics without the need to resort to complex cost increasing control program software.

In brief, this object is achieved by an arrangement wherein a spool of a lock-up control valve has a first effective area exposed to a release pressure which is supplied to a release chamber of the lock-up clutch and a second larger effective area which is exposed to the apply pressure which is supplied to an apply chamber. When acceleration is demanded when the lock-up clutch is in one of the slip or fully locked-up modes and a sudden demand for acceleration is made, the pressure differential between the apply and release pressures is reduced below the normal level for a predetermined period of time.

More specifically, the present invention is provided in a transmission which features: an input element in a drive connection with a prime mover; an output element in a drive connection with a gear train; a lock-up clutch operatively arranged between the input element and the output element, the lock-up clutch including an apply chamber in which an apply pressure is supplied and a release chamber into which a release pressure is supplied, the lock-up clutch being responsive to the pressure differential which exists between the apply pressure and the release pressure in a manner to induce one of a released condition, a partially engaged condition and a fully engaged condition; and pressure control means for controlling the pressure differential, the pressure control means including means for detecting a demand for acceleration and for reducing the pressure differential between the apply and release pressures below a normally required value for a predetermined time following the initiation of the acceleration demand.

BRIEF DESCRIPTION OF THE DRAWINGS

FIG. 6 shows a second embodiment of the present invention.

DETAILED DESCRIPTION OF THE PREFERRED EMBODIMENTS

Figure 1:
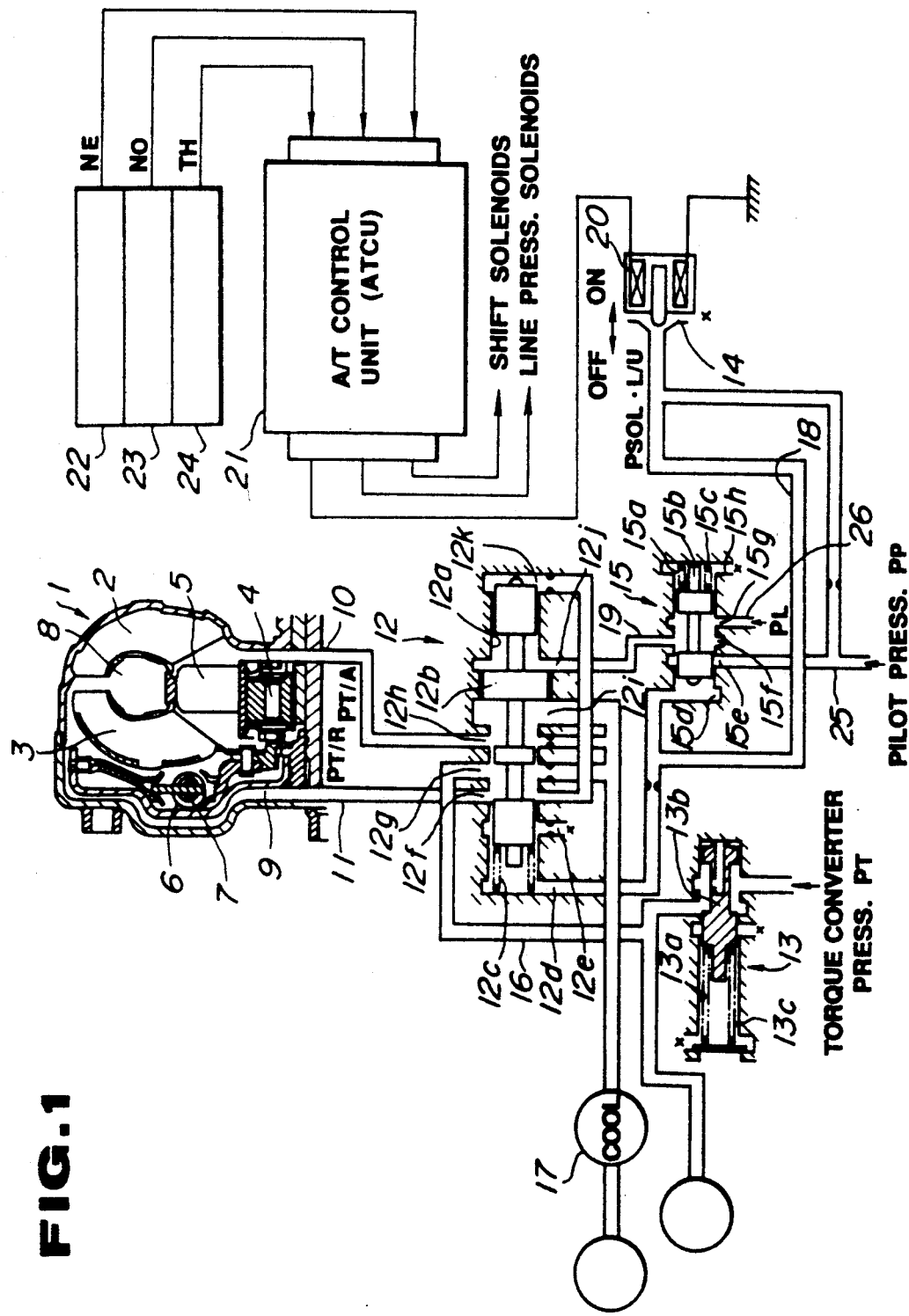
FIG. 1 shows a lock-up control arrangement according to a first embodiment of the present invention.

FIG. 1 shows a first embodiment of the present invention. In this arrangement, a torque converter 1 is operatively connected with a prime mover such as an internal combustion engine (not shown) and includes a pump impeller 2 (input element), a turbine runner 3 (output element); a one way clutch 4; and a stator 5 which is operatively connected to a case by way of the one-way clutch 4. The pump impeller 2 and the turbine runner 3 are arranged to be selectively connected by a lock-up clutch 6. A clutch damper 7 which includes a torsion spring is operatively interposed between the turbine runner 3 and the lock-up clutch 6 in order to attenuate large torque fluctuations which tend to occur during lock-up.

The hydraulic control arrangement via which the lock-up clutch 6 is controlled is fluidly communicated with a lock-up clutch apply chamber 8 (hereinafter referred to as apply chamber) and a lock-up clutch release chamber 9 (hereinafter referred to as a release chamber) of a thinly configured chamber arrangement, by way of apply pressure and release pressure conduits 10, 11. The conduit 10 transmits an apply pressure $P_{T/A}$ while conduit 11 transmits a release pressure $P_{T/R}$ from a lock-up control valve 12. The arrangement further includes a torque converter (T/C) relief valve 13 which regulates a basic pressure ($P_T$) to a predetermined maximum level; a lock-up solenoid valve 14 which modulates a supply of pilot pressure $P_P$ to form a solenoid pressure $P_{SOL.LU}$ in response to an externally applied duty signal; and a switching valve 15 which is supplied with both pilot pressure $P_P$ and line pressure $P_L$ and which supplies pilot pressure to the lock-up control valve 12 in place of line pressure when full lock up is required.

The lock-up control valve 12 controls the pressure levels which determine if the lock-up clutch is released, conditioned for slip lock-up or conditioned to produce full lock-up. This valve comprises a bore 12a in which a spool 12b is reciprocatively disposed and subject to a bias by a spring 12c. The bore is formed with ports 12d-12k. The spool is formed with an effective areas $A_1$-$A_4$ which are respectively acted on by solenoid, converter, apply and release pressures.

In this arrangement, the area $A_2$ which is exposed to the apply pressure is larger than the area $A_4$ which is exposed to the release pressure. As seen also in FIG. 5

The port 12d is supplied with solenoid pressure from the lock-up solenoid valve 14 via a conduit 18 the port 12e is used as a drain; the port 12g communicates with a torque converter pressure conduit 16; the port 12h communicates with the apply pressure conduit 10; the port 12i communicates with the oil cooler 17; the port 12j communicates with a switching pressure conduit 19 into which one of line pressure and pilot pressure are supplied.

The release valve 13 comprises a valve bore 13a in which a spool 13b and a spring 13c are disposed. As will be readily appreciated, when the bias produced by the torque converter pressure $P_T$ exceeds that produced by the spring 13c, a drain port is opened to relieve the excess.

The lock-up solenoid valve 14 is arranged so that when the solenoid 20 is de-energized (OFF), the port 12d is supplied with pilot pressure $P_P$ while when energized (ON), the port 12d is connected with a drain. Depending on the duty cycle of the signal applied to the solenoid 20, the level of solenoid pressure $P_{SOL.L/U}$ which is supplied to the port 12d is variable between the above mentioned limits.

The switching valve 15 comprises a bore 15a, a spool 15b and a spring 15c. The bore is formed with ports 15d-15h. The port 15d communicates with the solenoid pressure conduit 18, the port 15e communicates with a pilot pressure conduit 25, the port 15f communicates with the switching pressure conduit 19, the port 15g communicates with a line pressure conduit 26 and the port 15h, acts as a drain.

The solenoid 20 is operatively connected with an A/T control circuit (ACTU) 21 which received data inputs from a plurality of sensors such as an engine engine speed sensor 22, a transmission output shaft rotational speed sensor 23 and a throttle valve position sensor 24. The outputs Ne, No and TH of these sensor are applied to the ATCU wherein they are processed (using a suitable program) in a manner to determine which mode of operation the lock-up clutch should be conditioned to produce. In accordance with this decision, the duty cycle of the signal applied to the solenoid is determined. For example, the schedule shown in FIG. 4 can be used to used following a 3-4 upshift to determine which mode of operation should be implemented and when. After the appropriate mode is ascertained, a suitable driver circuit can be induced to output a signal having a duty cycle which will induce the switching valve 13 to output the required pressure to the lock-up control valve 12.

It will be noted that the output of the throttle valve position sensor 24 can be monitored in a manner which reveals sudden changes in the vehicle acceleration pedal depression degree and the rate at which the changes take place.

OPERATION

Figure 2:
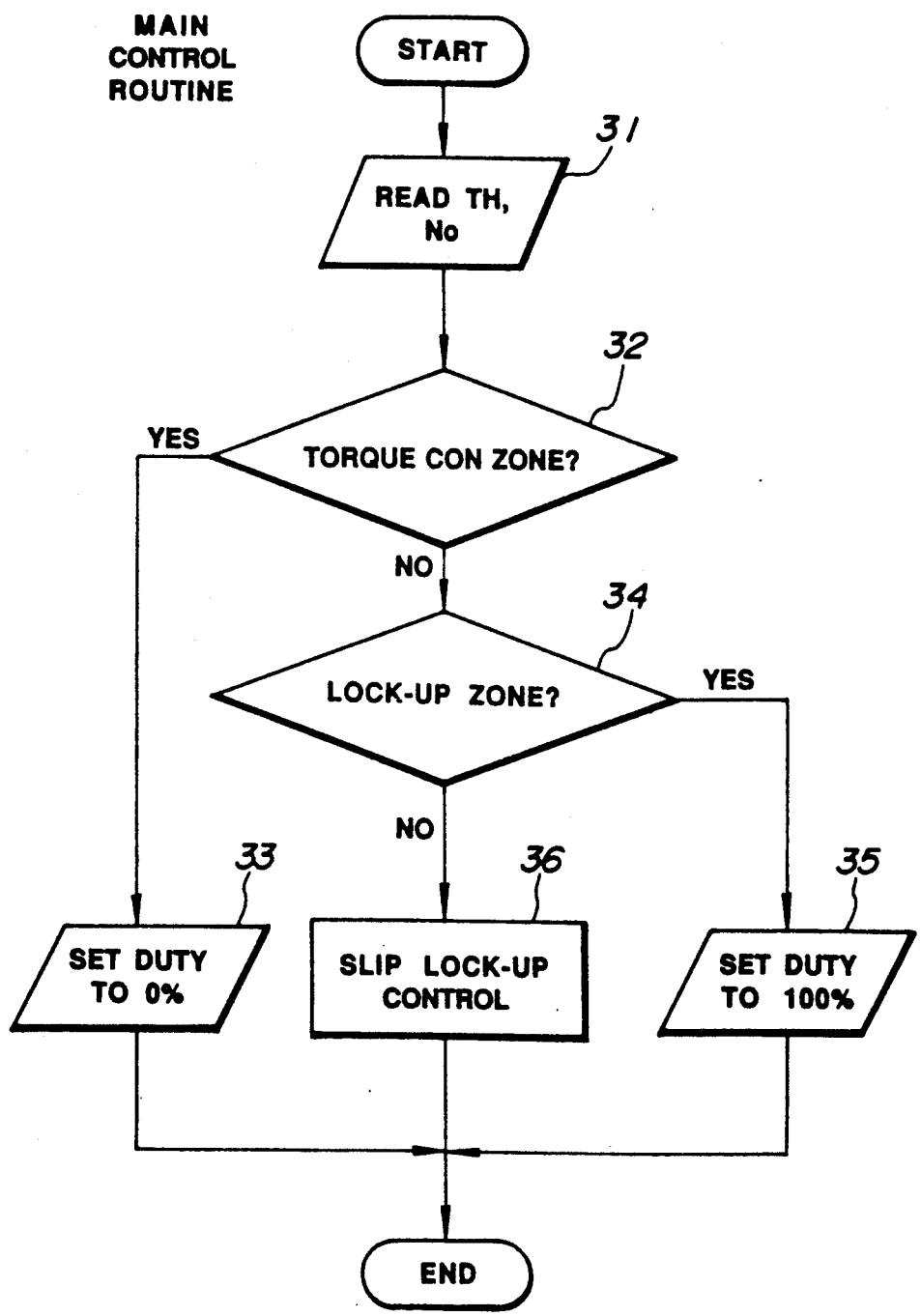
FIG. 2 is a flow chart depicting a main control routine which is used in connection with the control of the first embodiment.
Figure 3:
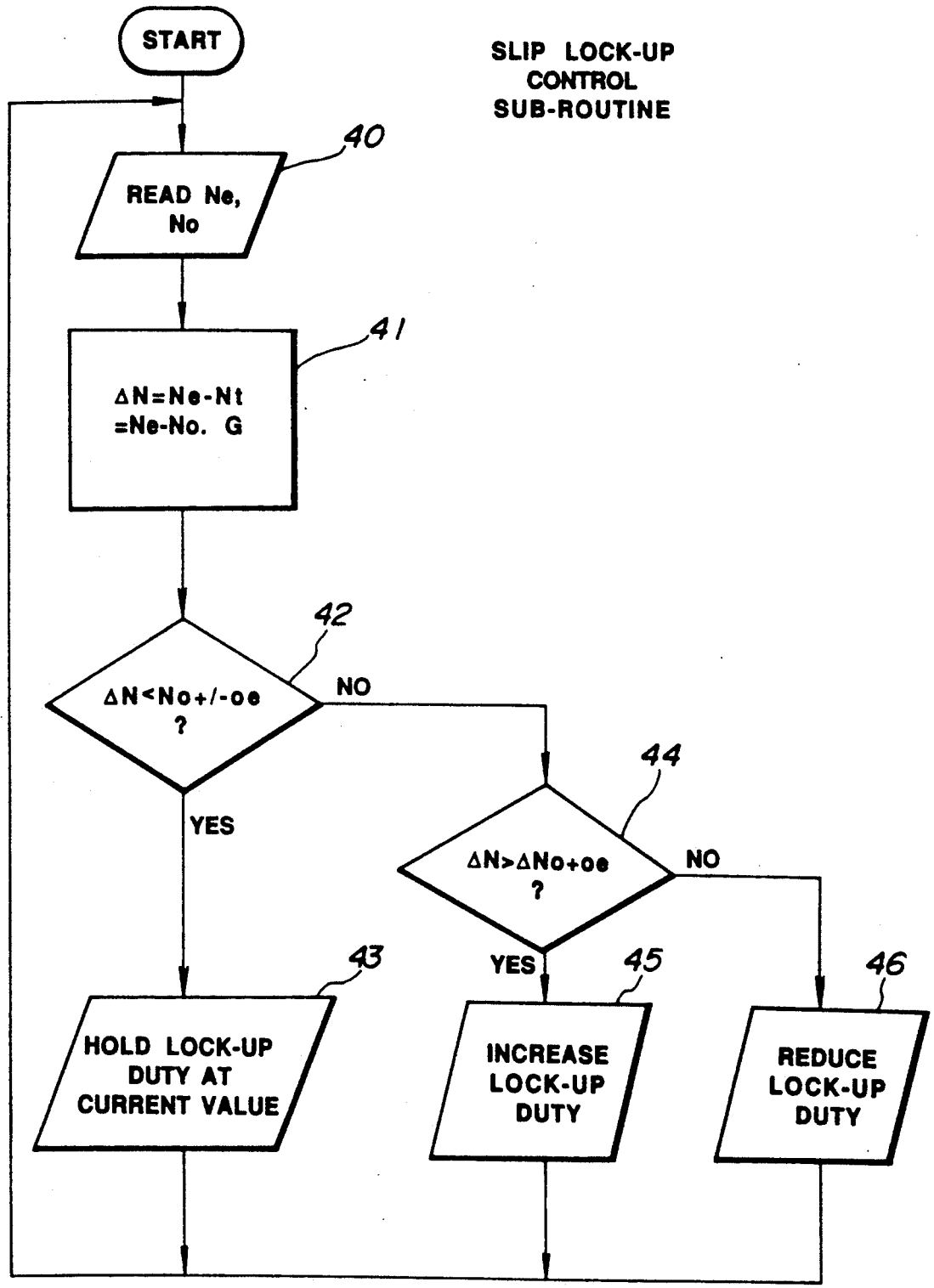
FIG. 3 is a flow chart which depicts a slip lock-up sub routine which is run in connection with the present invention.

FIG. 2 depicts in flow chart form, a main control routine which is used in connection with the control of the above described arrangement. FIG. 3 depicts a sub routine which is used to increase and decrease the duty cycle between the values for open and full lock-up mode of operation.

In connection with FIG. 2, the first step of the routine depicted therein is such as to read in engine load and vehicle speed data. This can be achieved by sampling the outputs of the throttle valve position sensor 24 and the transmission output shaft rotational speed sensor 23. At step 32, this data is used to determine what lock-up clutch condition is required under the instant set of operating conditions. In other words, this step is such as to determine if a torque converter mode (no lock-up) is required or not. If no lock-up is required, then the routine flow to step 33 wherein a command to set the duty cycle to 0% is issued. This of course is such as to de-energize the solenoid (OFF) and thus induce the situation wherein full level pilot pressure $P_P$ is supplied to the ports 12d and 15d.

Figure 4:
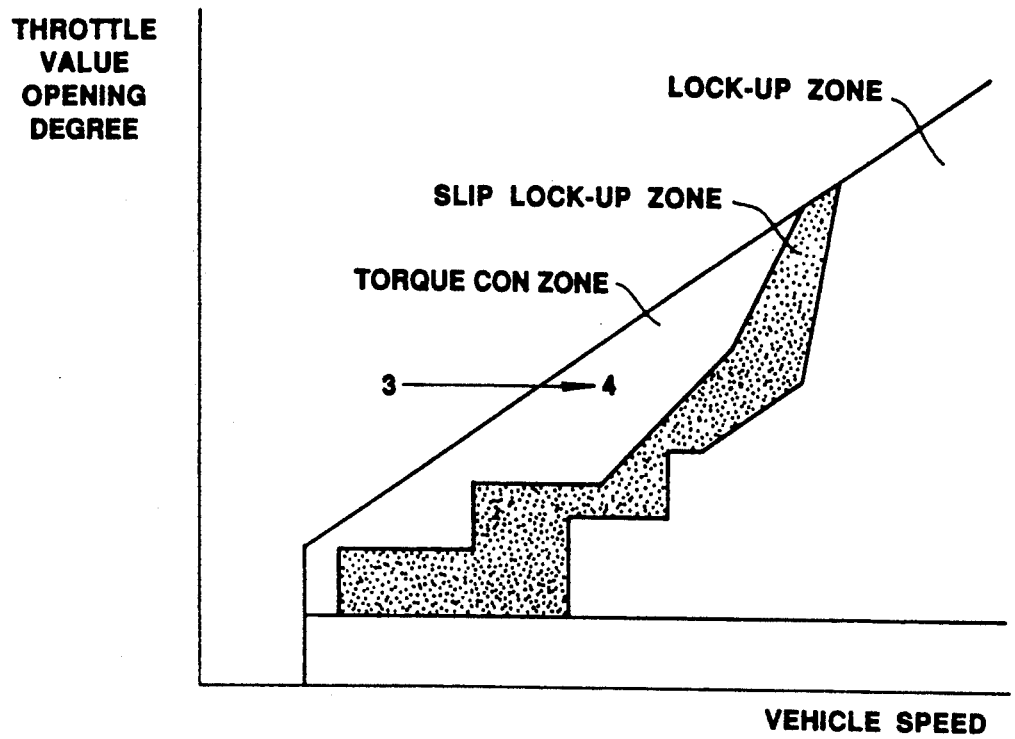
FIG. 4 is a graph showing the various operation zones in terms of engine load and vehicle speed.

On the other hand, if the outcome of step 32 is such as to indicate that a torque converter mode is not required, then the routine flows to step 34 wherein the instant engine speed and vehicle speed values are used in connection with mapped data of the nature shown in FIG. 4 to determine if full lock is required or not. In the event that full lock-up is indicated as being the appropriate mode of operation, the routine flows to step 35 wherein a command is made to raise the duty cycle of the signal applied to the solenoid to 100%. This of course induces the solenoid 20 to remain constantly energized and maintain the drain port of the valve 14 open. This reduces the pressure prevailing in ports 12d, 15d to zero.

However, in the event that the need for full lock-up is not indicated, then the routine flows to step 36. In this step, the sub-routine shown in FIG. 3 is run. This routine supervises the control of the slip lock-up mode. The first step (40) of this sub-routine is such as to read in the engine speed Ne, engine load TH and vehicle speed (transmission output shaft rotational speed No). At step 41, the slip amount $\Delta N$ is derived using the following equations:

$$\Delta N = Ne - Nt$$
$$= Ne - No \times G$$

where:
Nt denotes the rotational speed of the turbine; and
G denotes the instant gear ratio.

At step 42, it is determined if the instant slip ratio $\Delta N$ is compared with a target slip ratio value $\Delta No$. Depending on the outcome of this comparison the duty cycle is either incrementally increased or maintained at the instant value. That is to say, in the event that the value of $\Delta N$ is $\leq No \pm oe$ then the routine flows to step 43 wherein a command to hold the duty cycle at its current value is issued. However, if $\Delta N$ is $\geq \Delta No + oe$, then the routine goes to step 45 wherein a command to increase the duty cycle by a predetermined amount (by way of example) is issued. On the other hand, if $\Delta N < \Delta No - oe$ then the routine goes to step 46 wherein a duty cycle reduction command is issued.

As will be appreciated, after one or more runs of the instant sub-routine the value of $\Delta N$ will brought in the predetermined range of $\Delta No$.

During slip and full lock-up modes of operation and acceleration is demanded, the engine torque is increased in response to the accelerator pedal depression along with the level of the line pressure $P_L$, the latter being increased to ensure that the friction elements of the transmission are adequately engaged.

Under these conditions, the prior art arrangement discussed previously is such that the apply pressure $P_{T/A}$ and the release pressure $P_{T/R}$ are adjusted via feedback control in a manner to increase the value of $\Delta P$ along with the engine torque and thus enable relative slippage in the lock-up clutch.

However, in this case if the slip lockup or full lock-up mode is maintained irrespective of the driver having depressed the accelerator pedal in a manner which demands acceleration, the engagement of the clutch delays the required increase in engine speed and the resulting vehicle acceleration tends to be less than expected.

Thus, when the accelerator pedal is depressed, if the slip lock up mode of operation is currently being used the amount of slip is increased, or in the event of a full lock-up mode, the clutch is released for a fixed period of time.

In order to achieve the above, a basic feature of the present invention is to use a control valve other than the type which tends to reduce the $\Delta P$ value in response to an increase in line pressure and thus avoid the need to resort to special program software or changing the basic control program via which the value of $\Delta P$ is feedback controlled, to achieve the desired acceleration characteristics.

Figure 5:
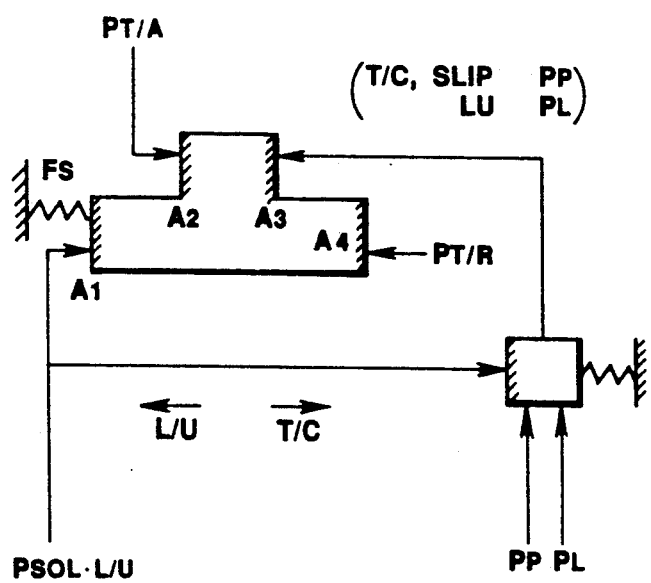
FIG. 5 is a schematic diagram showing the concept used in connection with the lock-up control valve according to the present invention.

That is to say, as shown in FIG. 5, when slip lock-up conditions are induced the following relationship can be considered to exist $$A1 \times PSOL \cdot /U + A2 \times PT/A + FS = A3 \times PP + A4 \times PT/R$$

$$PT/R = \frac{1}{A4} \{A1 \times PSOL \cdot L/U + A2 \times PT/A + Fs - A3 \times PP\}$$

Therefore the pressure differential $\Delta P$ is given by:

$$\Delta P = PT/A - PT/R$$
$$= \frac{1}{A2} \{(A4 - A2)PT/A + A3PP - A1PSOL \cdot L/U - FS\}$$

However, $P_P$ and $F_S$ are fixed, accordingly:

$$\frac{A3}{A4} PP - \frac{FS}{A4} = C \text{ (a constant)}$$

whereby $$\Delta P = \frac{A4 - A2}{A4} PT/A - \frac{A1}{A4} PSOL \cdot L/U + C \quad (1)$$

According to equation (1) if $(A_4 - A_2)/A_4 > 0$, then if the line pressure $P_L$ level increases, the level of the apply pressure $P_{T/A}$ increases relatively and the value of $\Delta P$ also increases. On the other hand, if $(A_4 - A_2)/A_4 < 0$, in the event that the line pressure level increases, then the $\Delta P$ level decreases relatively. Further, the value of $(A_4 - A_2)/A_4$ determined the amount by which $\Delta P$ changes.

Accordingly, while it is understood that setting $A_4 < A_2$ is preferred, a problem comes in the degree by which the ratio of $A_4$ to $A_2$ need be determined. Viz., if the difference is too big, then during open converter modes of operation when the accelerator pedal is returned, the $\Delta P$ value becomes excessively large and lock-up occurs while a ratio less than 0.5 is deemed appropriate.

In the instant embodiment, in view of the above, the apply pressure area $A_2$ is set to be larger than the release pressure area $A_4$ and thus establish the $(A_4 - A_2)/A_4 < 0$ relationship. Accordingly, if the accelerator pedal is depressed during either slip or full lock-up modes of operation, then the value of $\Delta P$ reduces with an increase in line pressure $P_L$ and the amount of slip is increased or lock-up is released. This induces an improvement in acceleration characteristics.

After acceleration, when the accelerator pedal is returned to a cruising degree of depression, the level of line pressure $P_L$ reduces and $\Delta P$ returns to its original value thus restoring the slip or full lock-up condition.

With the above arrangement the following merits are achieved:

[1] If the accelerator pedal is depressed at a rate which exceeds a predetermined value, while the lock-up clutch is conditioned to produce one of slip or full lock-up, the pressure differential $\Delta P$ which exists between the apply and release pressures $P_{T/A}$, $P_{T/R}$ is reduced below the level normally required for either the slip or full lock-up modes of operation for a predetermined period of time. As a result, good acceleration can be achieved even though the one of the slip or full lock-up modes of operation were employed at the time the acceleration was demanded.

[2] As the level of the line pressure is varied in response to the sensed accelerator pedal depression degree, the pressure differential areas of the lock-up control valve spool 12b are set so that when the line pressure increases the $\Delta P$ value decreases and there is no need to invest in expensive control program software. This reduces cost and eliminates the need for maintenance.

It will be appreciated that the construction and arrangement of the present invention is not limited to the above described embodiment and that various changes may be implemented without deviating from the scope of the same. For example, a second embodiment shown in FIG. 6 is such that the switching valve 15 is replaced with a full lock-up control valve 15A and a slip lock-up control valve 15B. The construction of the lock-up control valve 12' is modified in a manner wherein port 12j is replaced with ports 12l, 12m and 12n. In this case during open converter operation, neither conduits 19A, 19B are supplied with pilot pressure. On the other hand, when slip lock is required, only conduit 19A is pressurized, while in the case of full lock-up both are supplied with pilot pressure. This enables the same pressure to be applied to three different pressure responsive areas, one for each of the three modes of operation.

What is claimed is:

1. An automatic transmission comprising:
    an input element in driving connection with a prime mover;

an output element in driving connection with a power train;

a source of line pressure, the line pressure being elevated toward a preselected level in response to an acceleration demand for a preselected period;

a lock-up clutch operatively arranged between said input and output elements, said lock-up clutch including an apply chamber to which apply pressure is applied and a release chamber to which release pressure is applied, said lock-up clutch being responsive to a pressure difference between the apply and release pressures which is greater than a preselected value to establish engagement between said input and output element; and valve means including a spool which is movable in a first direction to elevate the release pressure for disengaging said lock-up clutch and in a second direction to elevate the apply pressure for engaging said lock-up clutch, the spool including a first effective area against which the apply pressure acts and a second effective area against which the release pressure acts when said lock-up clutch is substantially engaged the first effective area being greater than the second effective area to bias the spool in the first direction to reduce the pressure difference between the apply and release pressures below the preselected value in response to the elevation of the apply pressure acting on the first effective area caused by the elevation of the line pressure toward the preselected level.

2. An automatic transmission as set forth in claim 1, further comprising a solenoid valve which controls a pilot pressure having a constant pressure level to provide a control pressure variable among first, second and third pressure levels based on a lock-up clutch control signal, said valve means being responsive to the pressure level of the control pressure to bias the spool in the first and second directions to control the pressure difference between the apply and release pressures in a manner to induce one of, a lock-up clutch released condition, a partially engaged condition or a fully engaged condition.

3. An automatic transmission as set forth in claim 2, further comprising a switching valve which is operable to switch between first and second valve positions, the first valve position being such that a second control pressure is provided to said valve means which includes the pilot pressure, the second valve position being such that the second control pressure is provided to said valve means which includes the line pressure, the spool of said valve means further includes a fourth effective area, the third effective area being responsive to the control pressure provided by said solenoid valve to bias the spool in the first direction, the fourth effective area being responsive to the second control pressure to bias the spool in the second direction.

4. An automatic transmission comprising:

an input element in driving connection with the prime mover;

an output element in driving connection with a power train;

a source of line pressure, the line pressure being elevated toward a preselected level in response to an acceleration demand for a preselected period;

a lock-up clutch operatively arranged between said input and output elements, said lock-up clutch including an apply chamber to which apply pressure is applied and a release chamber to which release pressure is applied, said lock-up clutch being responsive to a pressure difference between the apply and release pressures which is greater than a preselected value to establish engagement between said input and output element;

a solenoid valve which controls a pilot pressure having a constant pressure level to provide a first control pressure variable among first, second, and third pressure levels based on a lock-up clutch control signal for controlling the pressure difference between the apply and release pressures in a manner to induce one of a lock-up clutch released condition, a partially engaged condition, or a fully engaged condition;

a switching valve operable to switch between first and second valve positions according the level of the first control pressure, the first valve position being such that a second control pressure is provided which includes the pilot pressure, the second valve position being such that the second control pressure is provided which includes the line pressure;

valve means including a spool which is movable in a first direction to elevate the release pressure for disengaging said lock-up clutch and in a second direction to elevate the apply pressure for engaging said lock-up clutch, the spool including a first effective area against which the apply pressure acts, a second effective area against which the release pressure acts, a third effective area against which the second control pressure acts, and a fourth effective area against which the first control pressure acts under condition where said lock-up clutch is substantially engaged, the first and second effective areas being opposed to each other in a pressure acting direction, the third and fourth effective areas being also opposed to each other in the pressure acting direction, the first effective area being greater than the second effective area to bias the spool in the first direction to reduce the pressure difference between the apply and release pressures below the preselected value in response to the elevation of the apply pressure acting on the first effective area caused by the elevation of the line pressure toward the preselected level.

* * * * *